May 22, 1962     K. E. JOHNSON     3,035,360
DITCHER APPARATUS
Filed Feb. 24, 1961     3 Sheets-Sheet 1
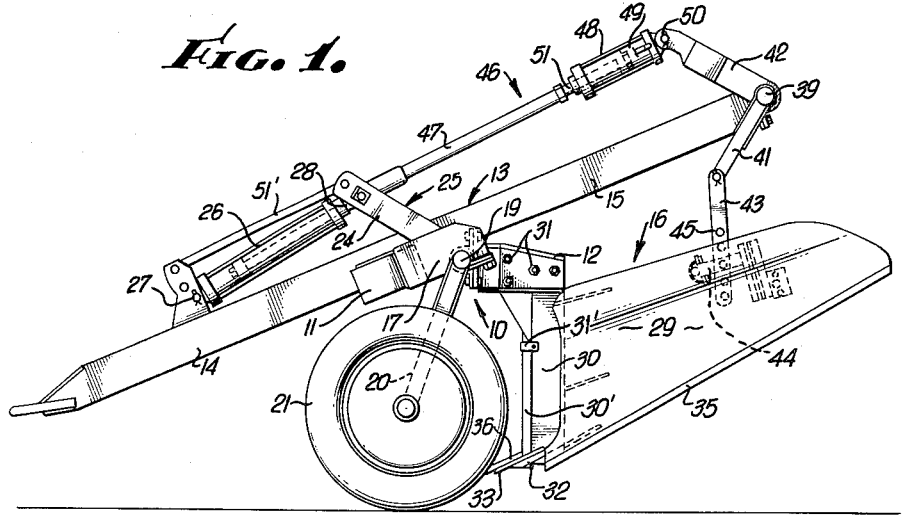
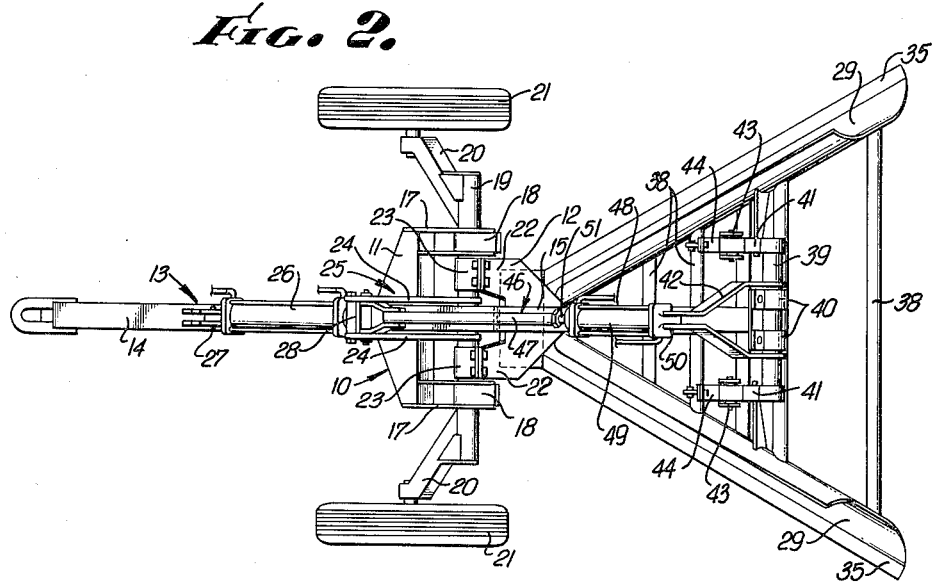
KENNETH E. JOHNSON
INVENTOR.
WHANN & McMANIGAL
Attorneys for Applicant May 22, 1962 K. E. JOHNSON 3,035,360
DITCHER APPARATUS
Filed Feb. 24, 1961 3 Sheets-Sheet 2
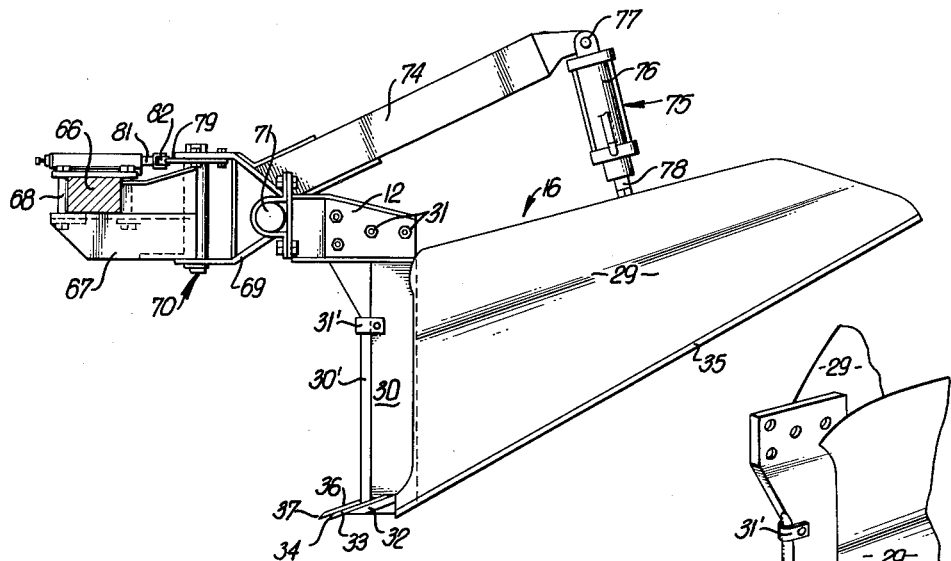
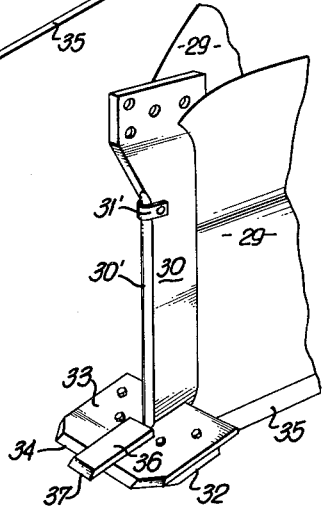
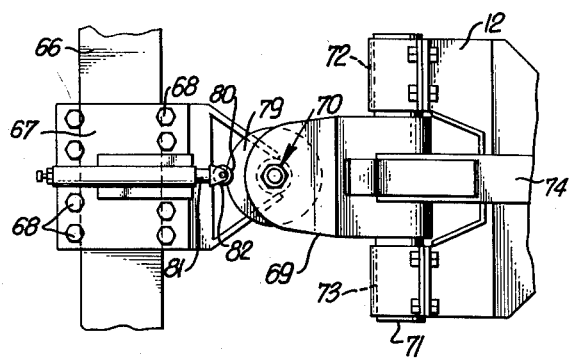
KENNETH E. JOHNSON
INVENTOR.
WHANN & McMANIGAL
Attorneys for Applicant May 22, 1962 K. E. JOHNSON 3,035,360
DITCHER APPARATUS
Filed Feb. 24, 1961 3 Sheets-Sheet 3

KENNETH E. JOHNSON
INVENTOR.
WHANN & McMANIGAL
Attorneys for Applicant

United States Patent Office 3,035,360
Patented May 22, 1962

3,035,360
DITCHER APPARATUS
Kenneth E. Johnson, Bell, Calif., assignor to Atlas Scraper and Engineering Co., Bell, Calif., a corporation of California
Filed Feb. 24, 1961, Ser. No. 91,374
9 Claims. (Cl. 37—98)

The present invention relates generally to earth working equipment, and is more particularly concerned with ditching apparatus of the type utilized for the making of irrigation and drainage ditches, and the like.

It is one object of the herein described invention to provide an improved wheeled carrier for ditcher plows, and unique actuating controls for adjusting the depth of the ditch, and varying the plow angle with respect to ground to maitnain this angle substantially constant as the ditch depth is varied. In other words, improved means are provided for automatically compensating for changes of plow angle due to changes in depth adjustment.

A further object is to provide independent means to facilitate adjustment of the plow angle for any particular depth of ditch, whereby the slope with the ditch sides may be varied to meet different conditions depending upon soil structure and other factors at a particular location.

A further object is to provide an improved double wing ditcher plow which is so constructed that its operation will be greatly enhanced and which will produce a cleaner, smoother ditch. To such end, an improved bottom cutting shovel is provided which is combined with an advance breaker point in such a way as to augment the cutting operation and accomplish the ditching more efficiently than in conventional arrangements.

Another object of the present invention is to provide improved ditching apparatus in which the wheeled carriage embodies a roll-over frame structure arranged to support a plurality of ditcher plows which may be selectively brought into operating position. More specifically, by providing single wing and double wing ditcher plows, it is possible to make irrigation ditches and drainage ditches on alternate passes across a field without the time consuming operation of having to change implements.

A still further object is to provide simplified ditcher apparatus which may be attached to a drawbar, and which includes unique latching means for maintaining the ditcher plow against lateral swinging movements, when the plow is in raised position, for example, when it is raised for transporting from one location to another.

Further objects of the invention will be brought out in the following part of the specification, wherein detailed description is for the purpose of fully describing the invention without placing limitations thereon.

Referring to the accompanying drawings, which are for illustrative purposes only:

FIG. 1 is a side elevational view of ditcher apparatus embodying the features of the present invention;

FIG. 2 is a plan view of the same;

FIG. 3 is an enlarged fragmentary view showing details of construction of a ditcher plow such as utilized in the apparatus of the present invention;

FIG. 6 is a modified arrangement adapted for attachment to a tool or drawbar; and FIG. 7 is an enlarged fragmentary view illustrating improved latching means as embodied in the arrangement shown in FIG. 6.

Figure 4:
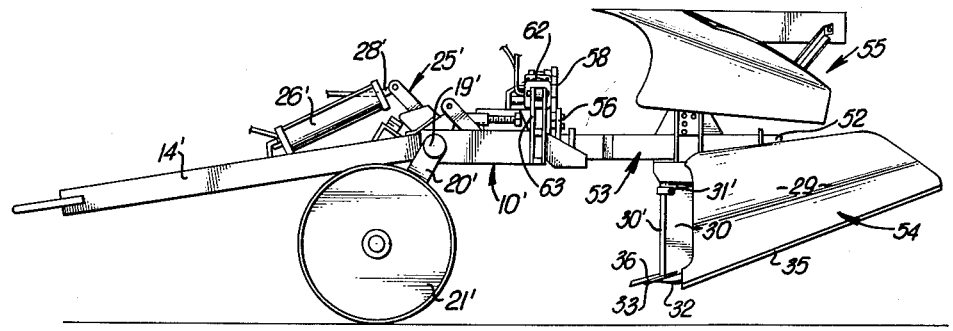
FIG. 4 is an elevational view of a modified roll-over carriage for selectively utilizing a plurality of different types of ditcher plows.

Referring more specifically to the drawings, the ditcher apparatus of the present invention, as shown in FIG. 1, is arranged to be towed behind a powered vehicle such as a tractor. In general, the apparatus includes a mobile frame structure, as generally indicated at 10, this frame structure being composed of a forward frame part 11 and a rear frame part 12 which are pivotally interconnected to form an articulate assemblage.

More specifically, the forward frame structure 11 carries an elongate beam 13 fixedly secured to the frame part and having a forwardly projecting end which forms a pulling tongue 14, and a rearwardly projecting end 15 which cooperates with the rearward frame part 12 to provide a support for a ditching plow 16.

The forward frame part 11 is provided with two or more bearing supports, such as the laterally spaced supports 17—17 which are respectively provided with bearings 18—18 in which there is rotatably mounted a shaft 19 so as to extend transversally to the longitudinal axis of the beam 13. This shaft at its opposite ends is provided with a projecting arm 20 in each case which supports a wheel 21 for rotation about an axis which is radially offset with respect to the shaft 19.

The rearward frame part 12 is constructed with side or lateral supports 22—22 which are provided with bearings 23—23 by means of which the rearward frame part 12 is attached to the shaft 19 for vertical swinging movements thereon.

The structure as thus far described provides a wheeled support for the frame 10 which may be raised and lowered in response to rotative movements of the shaft 19. This is accomplished by providing power means which are interconnected between the shaft structure and the tongue 14. More specifically, the shaft 19 has secured thereto a pair of elongate members 24 which are respectively positioned on opposite sides of the beam 13, these members having their inner ends connected to the shaft 19 and connected at their outermost ends so as to form in effect a radially extending actuating arm structure 25 having substantially right angled relationship with respect to the arms 20—20. Power means for actuating the arm structure 25 to effect raising and lowering movements of the frame 10 with respect to the wheels 21—21 are provided in this case and shown as comprising a fluid cylinder 26 having a pivoted anchor connection 27 at one end with the tongue 14. A power delivery element 28 is operatively associated with the fluid cylinder and connected with the outermost end of the arm structure 25. Thus, extension and contraction of the power means will effect raising and lowering movements of the frame structure.

It will be appreciated that such raising and lowering movements would have an effect upon the angular relationship of the ditching plow with respect to the ground, and that it is therefore necessary to provide means for supporting the plow in proper position and compensating for changes of angular relationship that might otherwise occur.

While different types of ditching plows may be supported from the frame part 12, for purposes of illustration the plow has in this instance been shown as comprising transversely curved moldboards 29—29 which are secured to an upstanding shank plate 30 and rearwardly diverge therefrom to form a double wing plow structure. The uppermost end of the shank plate is secured as by a plurality of bolts 31 to the frame part 12, while the lowermost end of the shank plate is provided with a transversely extending platform 32, as best shown in FIG. 3, this platform laterally projecting on opposite sides of the shank plate and forwardly thereof to provide a support for a shovel 33. The shovel is formed with a leading cutting edge 34 and operates as a scraper to cut and smoothly form the bottom of the ditch. The lowermost edges of the moldboards are provided with scraper edges 35 which form the side slopes of the ditch. The removed dirt is conveyed upwardly and outwardly due to the transverse structure of the moldboards and discharged along each side of the ditch as it is formed.

In some localities, the soil structure is such that the cutting edge 34 will not effectively break up the material as much as desired. The action of the shovel is augmented by providing a forwardly projecting member 36 which is centrally positioned of the shovel and has a forwardly projecting end portion which is provided with a cutting edge 37 forming a breaker point in advance of the cutting edge 34 of the shovel. This breaker member materially aids in the efficient operation of the ditcher plow and adapts it for universal use for different types of soil structures. The forward edge of the shank plate 30 is protected by an overlying wear guard 30' having its lower end socketed behind the member 36 and its upper end anchored by a securing clip 31'.

Rearwardly of the shank plate 30, the moldboards may be interconnected and rigidified to form a very strong structure by the provision of interconnecting bracing members 38.

The plow is adjustably supported adjacent its after end from the rearward projecting end 15 of the beam 13, and provision made for adjusting the angular relationship of the plow with reference to the ground, and also maintaining this relationship substantially constant during the raising and lowering movements of the frame 10. As shown, a transversely extending shaft 39 is supported at this end of the beam in spaced bearings 40, the ends of the shaft being respectively disposed on opposite sides of the beam and each having secured thereto a radially projecting arm 41 which cooperate with an angularly disposed arm structure 42 to form an angle lever. Each of the arms 41 is pivotally connected at its outermost end to one end of a link member 43 which is arranged for adjustable connection with a lift bracket 44 in each case connected to one of the bracing members. By means of a plurality of spaced holes 45 in the link 43, the effective length of the link may be varied to swing the plow together with the frame part 12 about its pivot so as to adjust the plow angle with respect to ground for different elevated positions of the frame 10.

The outermost end of the arm structure 42 is connected with the outermost end of the arm structure 25 by means of an adjustable link 46 comprised of an elongate member 47 forming a fixed section of the link, and a variable link section 48. The variable section is illustrated as comprising a fluid cylinder 49 having a pivoted anchor connection 50 with the outermost end of arm structure 42. A power delivery element 51 is operatively associated with the fluid cylinder and connected with the adjacent end of the link 47, this link having its other end connected with the arm 25. With this arrangement, it is possible to remotely control the variable section 48 so as to independently vary the plow angle for a given setting of the power means for raising and lowering the frame 10.

From the foregoing description, it is believed that it will be clearly evident that upon operation of the fluid cylinder 26, when the forward end of the tongue 14 is connected to a tractor or other means, the angle of the beam 13 will be varied during raising and lowering movements of the frame 10, and that this will result in a change of angle of the plow with respect to the ground. This change of angle, however will be automatically compensated for by the action of the link 46 and the actuation of the angle crank arrangement of the arms 41 and 42. Normally, with a lowering of the frame 10, the rearmost end of the plow 16 would be moved into relatively closer angular relation to the ground. However, the lowering movement of the frame results in a clockwise movement of the arms 41 and 42 which has the effect of raising the rearmost end of the plow so as to reestablish automatically the angular relationship and maintain the slope of the ditch sides constant even though the depth of the ditch is varied.

In the foregoing arrangement, a carry bar 51' may be connected across the power means for retaining it against operation and the frame 10 in raised position during transport movement of the apparatus from one location to another.

Figure 5:
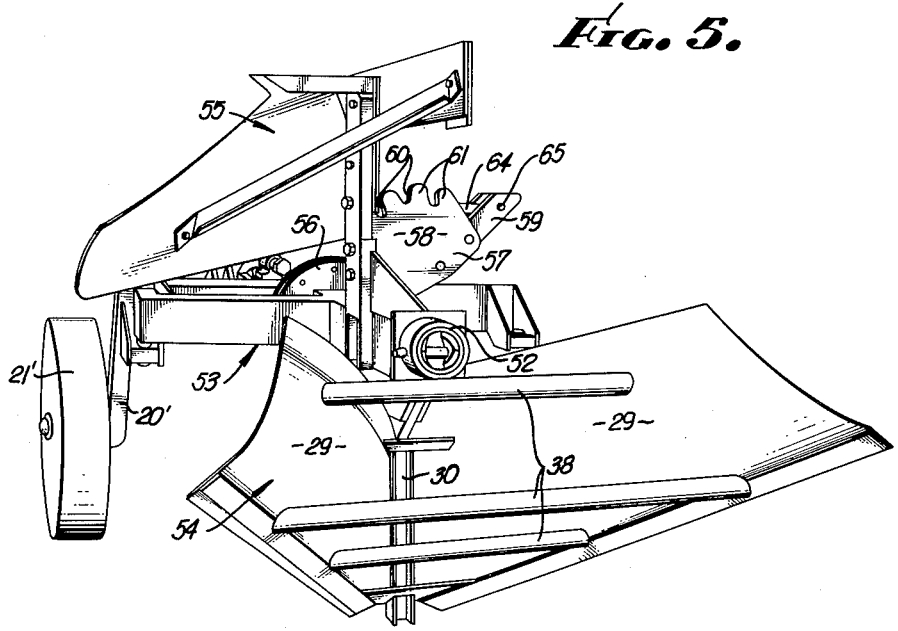
FIG. 5 is an enlarged perspective view showing details of the power actuating means for turning the roll-over frame for selectively bringing the plowing elements into operative position.

Referring now to FIG. 4, a modified arrangement is disclosed in which a plurality of ditching plows have been incorporated with a wheel supported framework and roll-over structure along the lines of that disclosed in the Roy L. Chandler, et al. United States Letters Patent No. 2,830,519, issued April 15, 1958. Like parts, corresponding to the elements shown in the arrangement of FIG. 1, have been indicated by primed numbers. The structure of FIG. 4 differs from that of FIG. 1 primarily in that the frame structure 10' carries a rearwardly extending cylindrical beam 52 (FIG. 5) upon which there is rotatably mounted a roll-over frame structure as generally indicated by the numeral 53. The roll-over frame structure carries a double wing ditcher plow 54 similar to that embodied in the ditcher shown in FIG. 1. This frame structure also carries a single wing ditcher plow as generally indicated at 55, these plows being supported on opposite sides of the roll-over frame and being arranged to be selectively brought into operation by rotation of the roll-over frame structure through substantially an angular movement of 180°.

Power means are provided for moving the roll-over frame structure from one operative position of the plows to the other operative position. This is accomplished by a mechanism similar to that shown in the above noted patent, and which briefly comprises a sector pin gear 56 which is affixed to the roll-over structure for rotation therewith. This sector gear is engaged by a driving member 57 which comprises the flat plate 58 connected to a swingable turning bracket 59 carried by the frame structure 10'. The outer edge of the plate 58 is provided with spaced indentations 60 extending generally in a radial direction from the rotational axis of the plate and opening outwardly for driving cooperation with the pins of the sector pin gear 56. The spacing between the indentations defines spaced projecting lobes 61 which are adapted to successively extend between the pins during driving operation. Swinging movement of the turning bracket 59 is accomplished by means of a fluid cylinder 62 which extends transversely of the frame structure 10' and the axis of rotation on the roll-over frame and has one end anchored to a bracket 63 on the frame structure. Associated with the fluid cylinder 62 is a power delivery element 64 which is connected to the outer end of the turning bracket 59 by means of a pivot pin connection 65. As thus arranged, the same apparatus may be utilized for the making of both irrigation and drainage ditches on alternate passes across a field, without the time consuming operation of having to change implements.

Referring now to FIGS. 6 and 7, there is shown a simplified ditcher which is adapted to be secured to a conventional tool or drawbar 66. In this arrangement, a multipart frame structure is utilized which includes a forward part providing a drawbar bracket 67 which may be fixedly clamped to the drawbar as by clamping bolts 68 in a position projecting at right angles from the drawbar.

An intermediate frame part 69 is secured to the drawbar bracket by a vertically extending pivotal mounting, as generally indicated at 70 and permitting horizontal swinging movement of the intermediate frame part 69 between predetermined limits.

The intermediate frame part carries a shaft 71 having its opposite ends projecting to form trunnions 72 and 73 which provide a horizontal pivot for a rearward frame part 12 of similar construction to that shown in FIGS. 1 and 2, and which supports the ditching plow 16 in a similar manner.

In this modification, the intermediate frame part 69 is provided with a rigidly mounted rearwardly projecting fixed beam 74 which is connected with the ditching plow through an extensible length link device 75. In this instance, the link device comprises a fluid cylinder 76 having one end pivotally anchored to the outer end of the beam 74 by a pivotal connection 77. Associated with the fluid cylinder 76 is a power delivery element 78 which connects with the plow structure. The link 75 provides means for elevating and lowering the plow, as well as means for adjusting the angular relationship of the plow to the ground.

In order to obviate jackknifing of the plow about the pivotal mounting 70, when the plow is in raised position, means are provided for latchingly releasably securing the intermediate frame part 69 in a position intermediate its limits of swinging movement. For this purpose, the intermediate frame part is provided with a disc portion 79 having a dwell notch 80 therein. On the drawbar bracket 67, there is mounted a spring biased plunger 81 carrying a roller 82 which is adapted to seat at the dwell notch and releasably retain the intermediate frame part against swinging movement, but during operation permitting the swinging movement to a proper position to accommodate the proper positioning of the ditching plow to perform its operation.

Various modifications may suggest themselves to those skilled in that art without departing from the spirit of my invention, and hence, I do not wish to be restricted to the specific form or forms shown or uses mentioned, except to the extent indicated in the appended claims.

I claim:

1. Ditcher apparatus, comprising: a frame structure including two pivotally connected parts; a pulling tongue on one of said parts; a ditcher plow carried by the other of said parts; axle means supporting said frame structure, said axle carrying a pair of laterally spaced ground-contacting wheels having axes of rotation offset with respect to said axle; means for raising and lowering said frame structure with respect to said wheels including a fluid cylinder actuator connected between said axle and tongue; other connection means between said actuator and the other of said parts including a second fluid cylinder actuator for relatively pivoting said frame parts to compensate for change in the angle of said plow with respect to the ground during said raising and lowering movements, said second fluid cylinder actuator being independently adjustable to change the angle of said plow with respect to the ground for any raised or lowered position of said frame.

2. Ditcher apparatus, comprising: a frame structure including two pivotally connected parts; an elongate beam fixed on one of said parts, said beam having a forwardly projecting end portion forming a pulling tongue, and a rearwardly projecting end portion; a ditcher plow carried by the other of said parts; axle means supporting said frame structure, said axle carrying a pair of laterally spaced ground-contacting wheels having axes of rotation off-set with respect to said axle; a radially extending arm connected to said axle; a fluid cylinder actuator connected between said beam and said arm operable to raise and lower said frame structure as a unit with respect to said wheels; an angle lever pivoted on said rearwardly projecting end of said beam; a link connection between one arm of said angle lever and said plow; and a connection between the other arm of said angle lever and said fluid cylinder actuator, whereby operation of said actuator also acts to pivotally swing said plow.

3. Ditcher apparatus, comprising: a frame structure including pivotally connected parts; an elongate beam fixed on one of said parts, said beam having a forwardly projecting end portion forming a pulling tongue, and a rearwardly projecting end portion; a ditching plow carried by the other of said parts; axle means supporting said frame structure, said axle carrying a pair of laterally spaced ground-contacting wheels having axes of rotation offset with respect to said axle; a radially extending arm connected to said axle; a fluid cylinder actuator connected between said beam and said arm operable to raise and lower said frame structure as a unit with respect to said wheels; an angle lever pivoted on said rearwardly projecting end of said beam; a link connection between one arm of said angle lever and said plow; and a link connection between the other arm of said angle lever and said fluid cylinder actuator including a second fluid cylinder actuator whereby said link may be varied as to length to adjust the relative position of said plow for any position of the first actuator.

4. Ditcher apparatus, comprising: a frame structure including two pivotally connected parts; an elongate beam fixed on one of said parts, said beam having a forwardly projecting end portion forming a pulling tongue, and a rearwardly projecting end portion; a ditcher plow carried by the other of said parts; axle means supporting said frame structure, said axle carrying a pair of laterally spaced ground-contacting wheels having axes of rotation offset with respect to said axle; a radially extending arm connected to said axle; a fluid cylinder actuator connected between said beam and said arm operable to raise and lower said frame structure as a unit with respect to said wheels; an angle lever pivoted on said rearwardly projecting end of said beam; an independently adjustable length link connection between one arm of said angle lever and said plow; and a connection between the other arm of said angle lever and said fluid cylinder actuator, whereby operation of said actuator also acts to pivotally swing said plow.

5. Ditcher apparatus having a wheeled frame structure with a pulling tongue, and means for raising and lowering said frame structure with respect to the wheels, a double wing ditcher plow, comprising: a pair of transversely curved moldboards forming rearwardly diverging wings extending from an upstanding shank plate adapted for connection at its upper end to said frame structure, and at its bottom end having a transversely extending platform member; a shovel member supported on said platform and having a forward horizontal cutting edge positioned ahead of said shank plate; and a forwardly extending projection centrally of said shovel in front of said shank plate, having a cutting edge ahead of the cutting edge of the shovel to provide a breaker point in advance of said shovel.

6. In ditcher apparatus having a wheeled frame structure with a pulling tongue and means for raising and lowering said frame structure with respect to the wheels, a double wing ditcher plow, comprising: a pair of transversely curved moldboards forming rearwardly diverging wings extending from an upstanding shank plate adapted for connection at its upper end to said frame structure, and at its bottom end having a transversely extending platform member; a shovel member supported on said platform and having a forward horizontal cutting edge positioned ahead of said shank plate; a forwardly extending projection centrally of said shovel in front of said shank plate having a cutting edge ahead of the cutting edge of the shovel to provide a breaker point in advance of said shovel; and a longitudinally extending wear guard member secured along the leading edge of said shank plate.

7. In ditcher apparatus: a mobile frame structure including a pulling tongue and a rearwardly extending elongate beam; a carrier structure mounted to turn on said beam to either of two operative positions; a single wing ditcher plow on said carrier moved thereby to one of said operative positions; a double wing ditcher plow on said carrier moved thereby to the other of said operative positions; and power means for selectively turning said carrier structure to said operative positions.

8. Ditcher apparatus for mounting on a drawbar, comprising: an articulated frame structure including a forward drawbar bracket adapted for rigid securement to a drawbar, an intermediate frame part connected at one end to said bracket by vertical pivot means for horizontal swinging movement, and having at its other end a pair of trunnion members, a rear frame part supported on said trunnions for vertical swinging movements, a ditcher plow rigidly secured to said rear frame part, an elongate beam secured at one end to said intermediate part and extending above said plow, an adjustable length link connection member between said beam and said plow for angularly adjusting the rear frame part and plow on said trunnions, and latch means for releasably retaining said intermediate frame part in right angled relation to said drawbar, with the plow in raised position.

9. Ditcher apparatus for mounting on a drawbar, comprising: an articulated frame structure including a forward drawbar bracket adapted for rigid securement to a drawbar, an intermediate frame part connected at one end to said bracket by vertical pivot means for horizontal swinging movement, and having at its other end a pair of trunnion members, a rear frame part supported on said trunnions for vertical swinging movements, a ditcher plow rigidly secured to said rear frame part, an elongate beam secured at one end to said intermediate part and extending above said plow, an adjustable length link connection member between said beam and said plow for angularly adjusting the rear frame part and plow on said trunnions, and means for releasably retaining said intermediate frame part in right angled relation to said drawbar with the plow in raised position, said latch means including a member on said intermediate frame having a dwell notch therein, and a spring impelled member supported on said bracket having an end adapted to latchingly seat in said dwell notch.

References Cited in the file of this patent
UNITED STATES PATENTS

| | | |
|---|---|---|
| 1,460,839 | Biggam | July 3, 1923 |
| 1,477,061 | Kauffman | Dec. 11, 1923 |
| 1,610,083 | Franzen | Dec. 7, 1926 |
| 2,153,038 | Corbett | Apr. 4, 1939 |
| 2,280,014 | Thomas et al. | Apr. 14, 1942 |
| 2,337,777 | Seaholm | Dec. 28, 1943 |
| 2,691,930 | Forgy | Oct. 19, 1954 |
| 2,830,519 | Chandler et al. | Apr. 15, 1958 |
| 2,955,369 | Shumaker et al. | Oct. 11, 1960 |

FOREIGN PATENTS

| | | |
|---|---|---|
| 466,477 | Canada | July 11, 1950 |